Jan. 3, 1950 C. L. GRIMM 2,493,487
ARTIFICIAL FISH BAIT
Filed Nov. 22, 1947

INVENTOR.
Cliel L. Grimm
BY Barthel & Bugbee
ATTYS

Patented Jan. 3, 1950

2,493,487

UNITED STATES PATENT OFFICE 2,493,487

ARTIFICIAL FISH BAIT

Cliel L. Grimm, Highland Park, Mich.

Application November 22, 1947, Serial No. 787,576

1 Claim. (Cl. 43—42.48)

This invention relates to artificial fish baits, and in particular to baits which dive and swim to and fro.

One object of this invention is to provide an artificial fish bait which, when drawn through the water, will first dive beneath the water and then level off and "swim" along while turning to and fro in an undulating path so as to resemble the motion of a natural minnow or frog.

Another object is to provide an artificial fish bait which has its center of gravity and center of buoyancy located at approximately the midpoint of the bait so that the forward and rearward sections of the bait tend to pivot around the midportion and are cut away so as to undulate to and fro around the mid-portion as a center.

Another object is to provide an artificial fish bait having a forward section including a pair of inclined concave portions interconnected by an approximately flat portion with a shoulder at the forward edge thereof so that the forward concave portion causes the bait to dive, the shoulder creates eddy currents and the rearward concave portion not only counteracts the diving action, causing the bait to be restored to a horizontal position beneath the surface, but also, when subjected to the eddy currents from the shoulder, causes the bait to waggle to and fro around its mid-portion, thus simulating the natural swimming motion of minnows, frogs and crabs.

Figure 2:
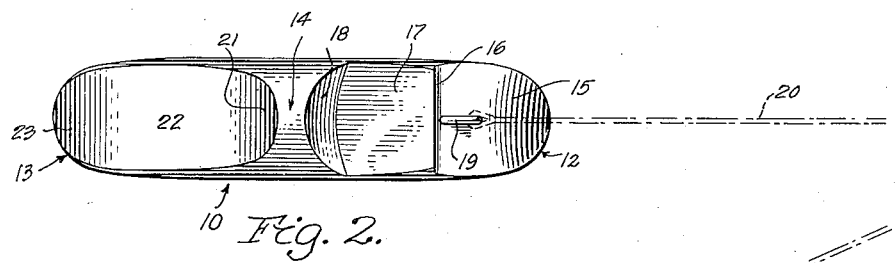
Figure 2 is a top plan view of the fish bait shown in Figure 1.
Figures 1, 3:
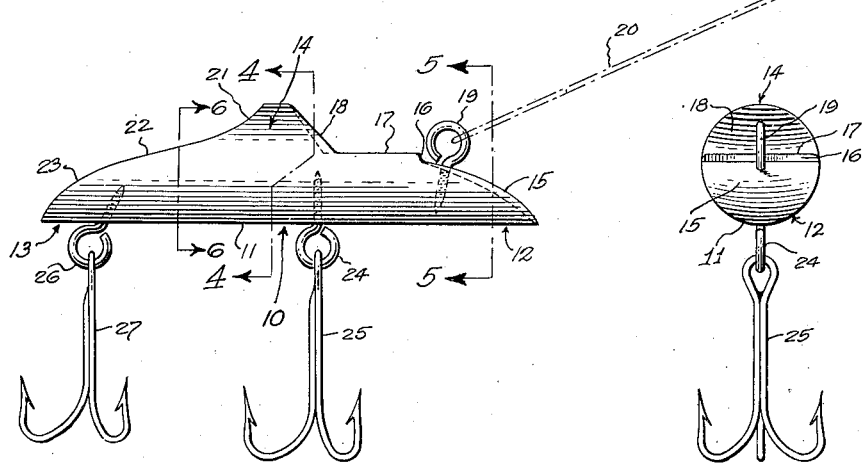
Figure 1 is a side elevation of an artificial fish bait, according to a preferred form of the invention.
Figure 3 is a right-hand end elevation of the bait shown in Figure 1.
Figure 5:
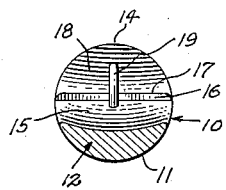
Figure 5 is a cross-section along the line 5—5 in Figure 1, showing the nature of the toe or forward concave portion of the bait.
Figure 4:
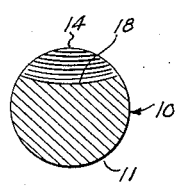
Figure 4 is a cross-section along the line 4—4 in Figure 1, showing the nature of the sump or rearward concave portion of the bait.

Referring to the drawings in detail, Figures 1 and 2 show an artificial fish bait according to a preferred form of the invention as consisting of an elongated body 10 with a partially cylindrical undersurface 11 and forward and rearward sections 12 and 13 respectively, separated from one another by a mid-section 14 of approximately circular cross-section.

The forward section 12 includes an upwardly-inclined toe portion 15 terminating in a shoulder 16 above which is a horizontal or flat portion 17. The latter terminates in an upwardly-inclined concave sump or heel portion 18. The toe portion 15 is approximately saddle-shaped in configuration in that it is convexly curved lengthwise (Figure 1) and concavely curved crosswise. The transverse concavity of the toe portion 15 flattens out as it approaches the shoulder 16, and a screw eye 19 is mounted near this location for the connection of a fishing line 20. The latter is conventional and may include the usual swivel, with or without a leader and also possibly a sinker, depending upon the fishing conditions encountered.

The sump portion or heel portion 18 is inclined upwardly and rearwardly from the flat portion 17 and is concave both lengthwise and crosswise. At its upper rearward edge it merges with the midsection 14 which, as previously stated, is of approximately circular cross-section.

Figure 6:
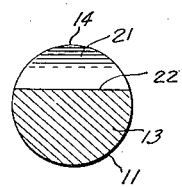
Figure 6 is a cross-section along the line 6—6 in Figure 1, showing the flat transverse configuration of the rearward portion.

The rearward section 13 is cut away, first in a concave portion 21, merging into a short flat portion 22 which in turn merges into a convex portion 23, the transverse configuration of the portions 21, 22 and 23 being approximately flat or a straight line (Figure 6). The body 10 of the bait thus roughly resembles an inverted lady's slipper.

Mounted approximately beneath the sump or rearward concave portion 18 is a screw eye 24 which carries a treble hook 25 or any other suitable type of hook. Similarly, near the rearward end of the bait there is mounted a screw eye 26 carrying a second treble hook 27, preferably slightly smaller in size than the treble hook 25, so as not to upset the balance of the bait. The balance of the bait body 10 is such that when it is placed upon a knife edge and adjusted so that its forward section 12 balances its rearward section 13, the knife edge lies approximately beneath the center of the mid-section 14. In this manner, the center of gravity of the bait and also its center of buoyancy are located in the mid-section 14 of the bait body 10, this being accomplished by cutting away the rearward portion 13 to correspond roughly with the cutting away of the forward portion 12.

The body 10 is preferably manufactured from wood or plastic material, it being hollowed out internally to provide buoyancy if made of plastic material. The bait is used either by trolling or casting in the ordinary way. Assuming that the line 20 is attached to a reel mounted on an ordinary casting rod, the fisherman casts the bait in the ordinary way and then starts to retrieve it by reeling in the line 20. As the bait is drawn through the water, the toe portion 15, by reason of its upward and rearward curvature causes the bait to dive beneath the water.

This diving continues until the shoulder 16 and flat portion 17 are submerged and the sump portion or rearward concave portion 18 begins to submerge. When this occurs, the water deflected from the shoulder 16 encounters the concave inclined surface 18 and causes a restoring force to be applied to the bait. This restoring force swings the body 10 around the mid-section 14 and counteracts the diving effect of the toe portion 15. The bait thenceforth travels in an approximately horizontal plane but swings to and fro in that plane due to the action of the eddy currents set up by the water deflected from the shoulder 16 across the horizontal flat portion 17.

The fact that the rearward section 13 is cut away as at 21, 22 and 23 along its upper surface, enables the rearward section 13 to swing freely in the opposite direction from the forward section 12. In other words, the cooperation of the toe portion 15 acting as a scoop with the sump portion 18 acting as a restoring vane and also as an oscillation-causing surface imparts a unique motion to the bait as it is drawn through the water.

In addition to the steady forward motion of the bait as it is drawn through the water by trolling or by retrieving after casting, the bait may be held stationary in a running stream, such as a river or brook, and the same effects brought about. The fisherman can also alter the regularity of motion by twitching or jerking the line, whereupon the bait will suddenly dive, simulating the action of a minnow attempting to escape from a game fish. By imparting a series of such jerks to the line and hence to the bait, the bait will dart downward in a series of dives corresponding to the series of jerks. After each dive, the bait straightens out to travel upon a level path at a depth depending upon the speed at which the bait is drawn through the water.

The bait may be given various combinations of colors, according to the locality or fishing conditions under which it is to be used. The bait is also made in several sizes, depending upon the type of fish which it is intended to catch, all the way from the tiny plug type bait which is used with a fly-rod to a large heavy bait for muskellunge or other large game fish.

What I claim is:

An artificial fish bait comprising an elongated body the lower portion of which is a portion of a cylinder in cross section and is straight from end to end, the front end thereof having its face of concave formation transversely and convex longitudinally, the upper portion of said face providing a substantially vertical wall, a section of the body adjacent said wall being flat and extending rearwardly toward the mid-portion of said body, a section of the body at the mid-portion being wider in extent than the portion having the flat wall and having a front convex face and a rear curved face, the latter face being in the form of an ogee curve in longitudinal elevation and extending to the rear end of the body, a screw eye secured to the front face adjacent the shoulder, and hooks secured to the lower portion of the body.

CLIEL L. GRIMM.

REFERENCES CITED

The following references are of record in the file of this patent:

UNITED STATES PATENTS

| Number | Name | Date |
| --- | --- | --- |
| 1,558,470 | Gibson | Oct. 27, 1925 |
| 1,752,706 | Sobecki | Apr. 1, 1930 |
| 2,100,289 | Khoenle | Nov. 23, 1937 |